Dec. 28, 1954          W. A. FINK          2,697,963
PROJECTED READING LINE VIEWING DEVICE FOR WEIGHING SCALES
Filed April 18, 1952          3 Sheets-Sheet 1
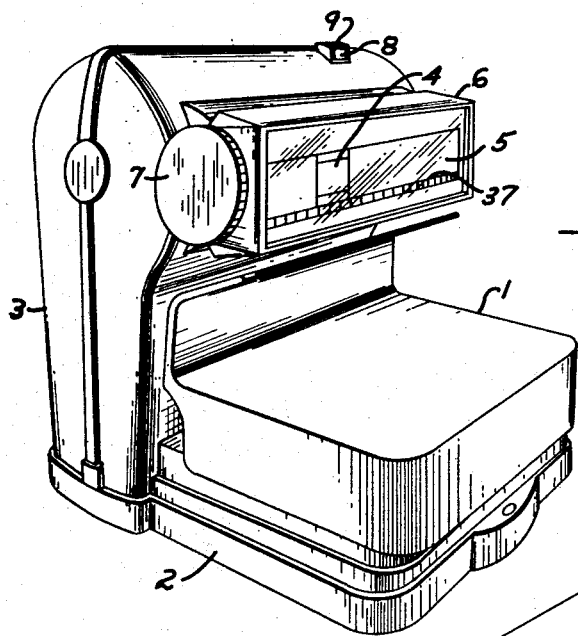
Fig. I
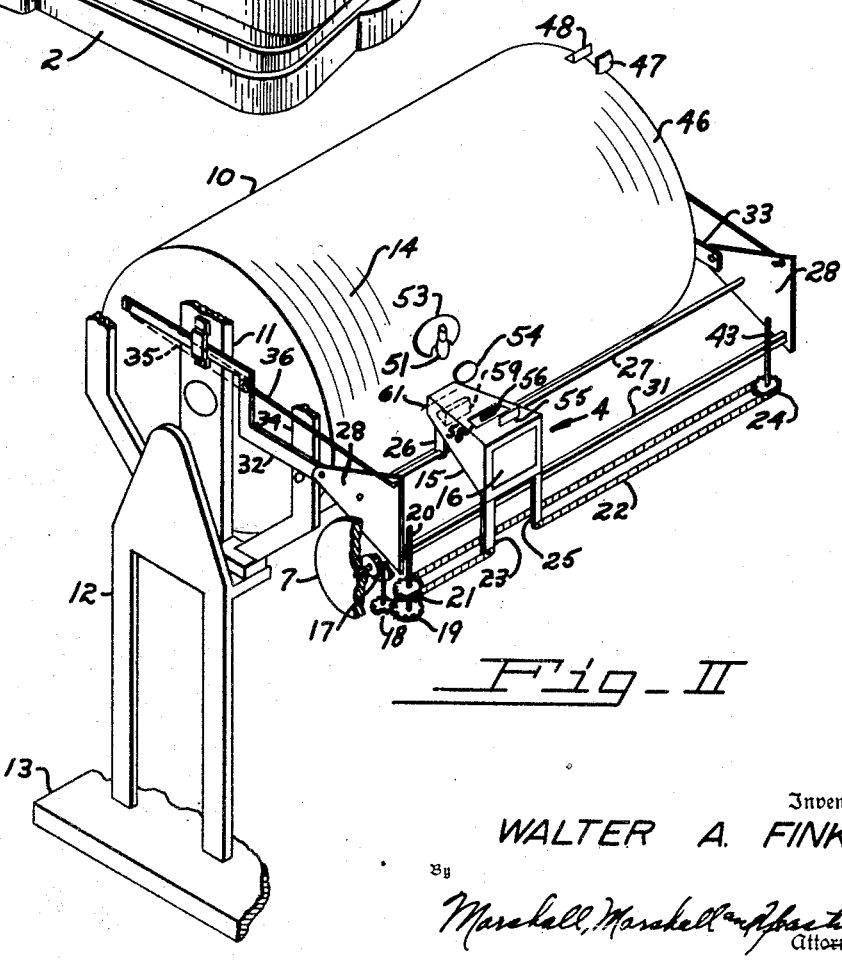
Fig. II
Inventor
WALTER A. FINK
By Marshall, Marshall
Attorneys

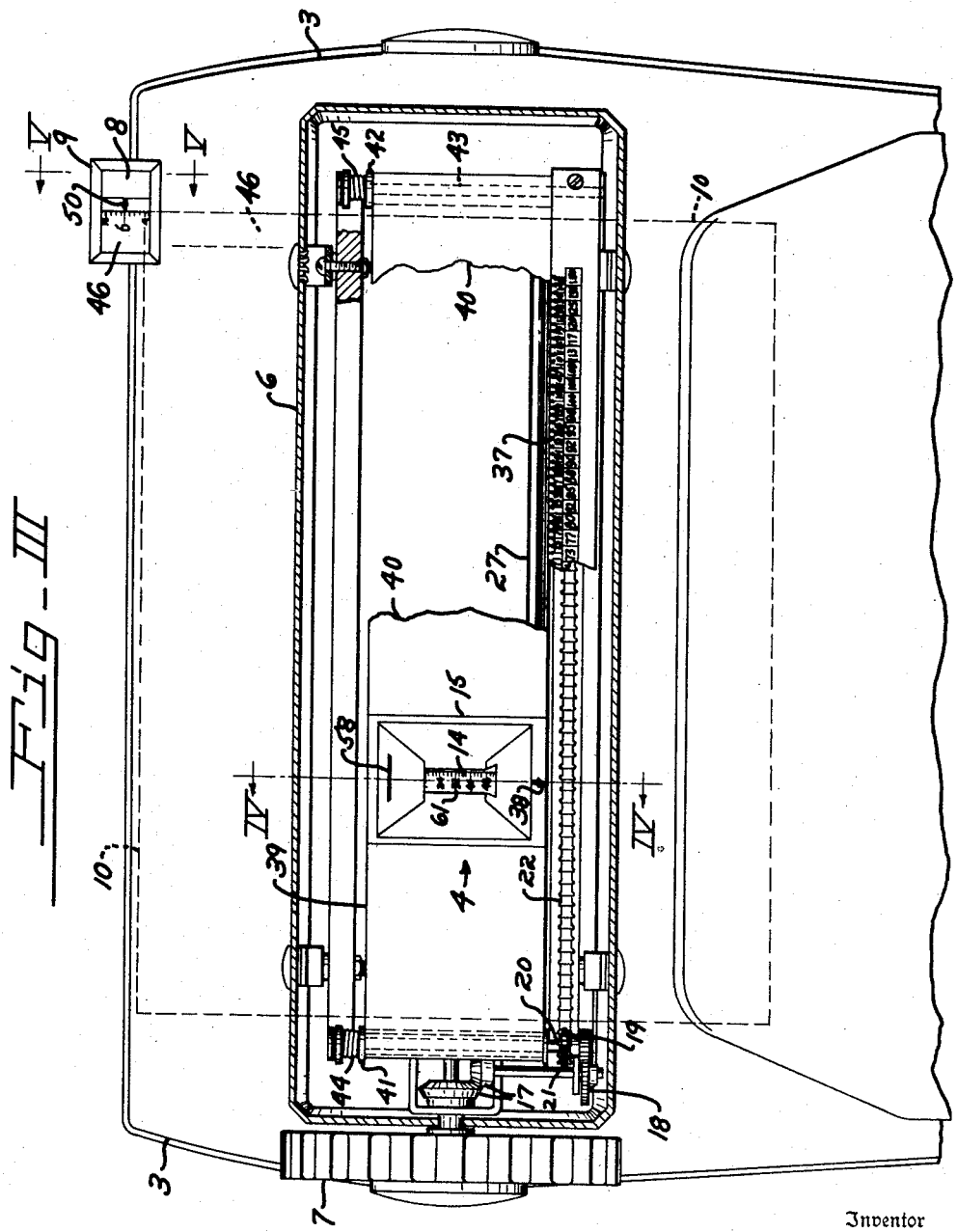

Dec. 28, 1954   W. A. FINK   2,697,963
PROJECTED READING LINE VIEWING DEVICE FOR WEIGHING SCALES
Filed April 18, 1952   3 Sheets-Sheet 3
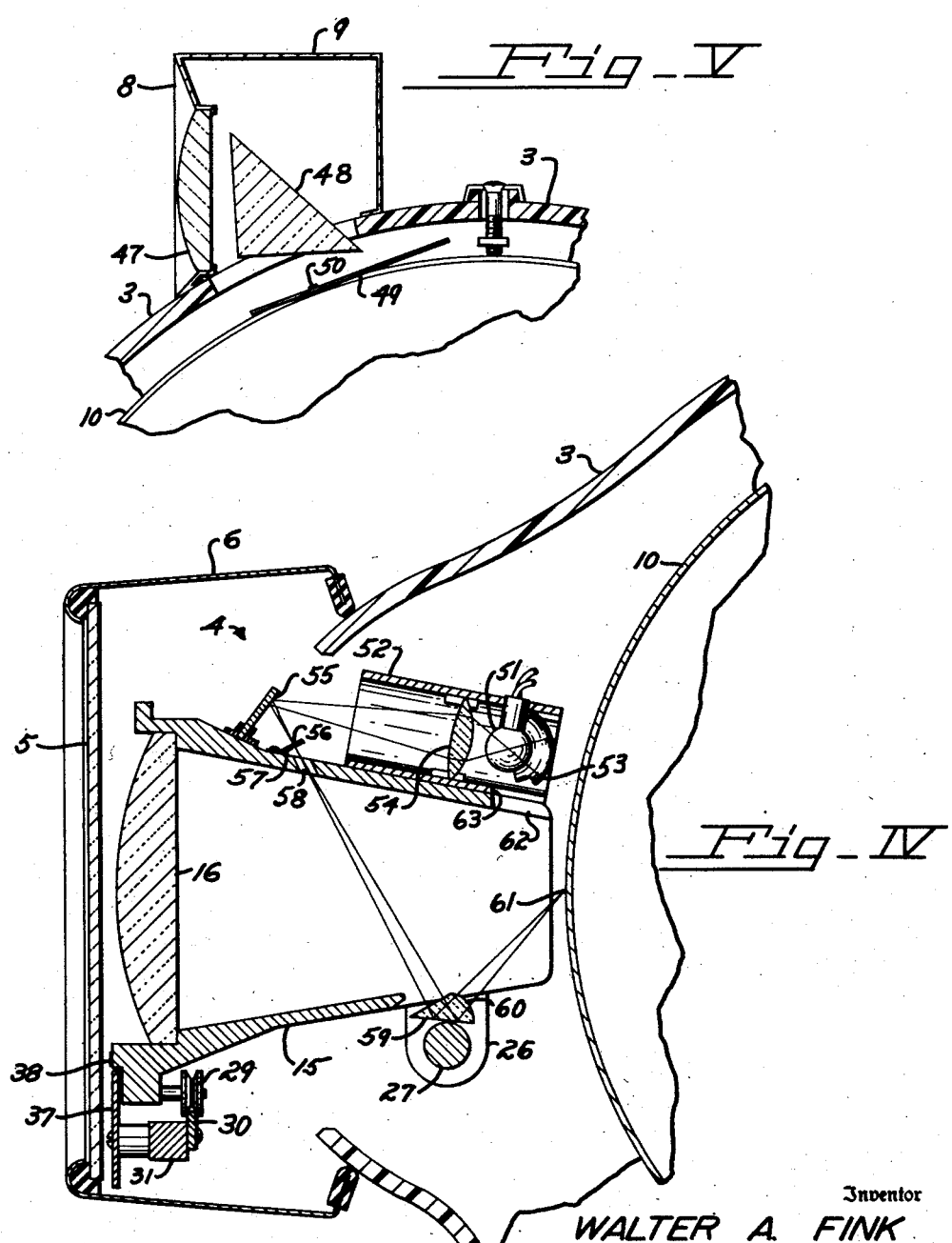
Inventor
WALTER A. FINK

2,697,963

PROJECTED READING LINE VIEWING DEVICE FOR WEIGHING SCALES

Walter A. Fink, Toledo, Ohio, assignor to Toledo Scale Company, Toledo, Ohio, a corporation of New Jersey Application April 18, 1952, Serial No. 283,039

2 Claims. (Cl. 88—24)

This invention relates to viewing devices for weighing scales and in particular to an improved structure for projecting a sharp bright line of light onto the surface of a movable indicia-bearing chart so that the line of light may serve as an index line.

It is usual in moving chart weighing scales to provide a stretched thread or wire adjacent the surface of the moving chart to serve as an index. While such an arrangement is satisfactory as long as the indications are always viewed from the same position, errors in reading are quite likely to occur because of parallax whenever the viewer's position is changed. It has previously been proposed to project a beam of light onto the chart but the suggested structures were incapable of providing a sharp line that was also bright enough to be easily visible without requiring an excessively large projection lamp the heat of which tended to cause serious disturbance within the structure of the scale.

It is the object of this invention to provide a compact lens assembly and light source for concentrating a large amount of the light emitted from a relatively small light source into a bright sharp line of short length projected onto the indicia to be read.

Another object of the invention is to provide a compact viewing device that is movable along the intended reading line of a movable chart, which device carries an optical system that projects an index line onto the visible portion of the chart.

More specific objects and advantages are apparent from the following description of a preferred embodiment of the invention.

According to the invention a lens cell that is movable parallel to the surface of the chart is provided with an optical projection system arranged to project an image of a brilliantly illuminated slit onto the surface of a weighing scale chart to provide an index against which the graduations may be read.

A preferred embodiment of the invention is illustrated in the accompanying drawings.

In the drawings:

Figure I is a front quarter view, in perspective, of a weighing scale embodying the invention.

Figure II is a simplified isometric view showing the relative positions of the chart, viewing device, and optical projection system together with the structure to show the cooperation of the elements.

Figure III is a front elevation, at enlarged scale and with parts broken away, showing the indicator portions of the weighing scale as they may be seen from an observer's position.

Figure IV is a fragmentary elevation, at enlarged scale, of the viewing device and the optical projection system, as seen from the line IV—IV of Figure III.

Figure V is a vertical section, at enlarged scale, of a viewing mechanism for displaying weight indications, as seen from the line V—V of Figure III.

These specific figures and the accompanying description are intended merely to illustrate the invention but not to impose limitations on the claims.

An indicating mechanism embodying the invention is of particular value in weighing scales employed in retail markets which weighing scales are provided with cylindrical charts bearing large numbers of graduations indicative of the cost of the commodity being weighed and computed at various prices. Such a weighing scale comprises a load receiver or platter 1 that is supported by a lever system enclosed in a low forwardly-extending portion of a base 2. A housing 3 erected over the rear portion of the base 2 contains load counterbalancing and indicating mechanism including a viewing device 4 mounted behind a window 5 in a forwardly-extending tiltable housing 6. The viewing device 4 may be moved along the length of the window 5 by rotation of a hand wheel 7 mounted at one end of the tiltable housing 6.

In this particular embodiment value graduations are displayed through the viewing device 4 while weight indications are displayed through a window 8 of a cupola-like housing 9 atop one end of the scale housing 3.

Referring to Figure II the weighing scale indicating mechanism includes a rotatable chart 10 that is supported by an upwardly extending arm 11 of an end pedestal 12 erected from a base portion 13 at the rear of the base 2 of the scale.

The chart 10 bears on its cylindrical surface value indicia arranged in a plurality of bands or circumferential rows of indicia 14 adapted to be viewed through the viewing device 4. The device 4 comprises a frusto-pyramidal lens cell 15, and a magnifying lens 16 in the front end of the lens cell 15. The taper of the sides of the pyramidal lens cell 15 and the magnifying power of the lens 16 are selected so that the internal walls of the pyramidal cell 15 appear to be parallel to each other rather than to converge as they actually do. The end of the lens cell 15 adjacent the weighing scale chart 10 is open and is of a width to expose one of the bands or circumferential rows of indicia 14.

Each of the rows of indicia 14 includes graduations corresponding to the money value of a load on the load receiver 1 as computed at a particular price corresponding to that particular row or band of indicia.

A manually operated drive including the hand wheel 7 is arranged to drive the viewing device 4 along the length of the chart 10 to selectively display the money value graduations corresponding to any selected price. The traversing mechanism includes the hand wheel 7, a pair of bevel gears 17 one of which is driven by the hand wheel 7 and the other of which drives the gear 18 which meshes with another gear 19 mounted on a vertical shaft 20. A chain sprocket 21 fixed to the shaft 20 drives a chain 22, a first end of which is rigidly attached to a downwardly depending arm 23 of the viewing device 4 and the other end of which, after passing over a second chain sprocket 24, is attached to a second downwardly depending arm 25 of the viewing device 4. The pyramidal lens cell 15 to which the downwardly depending arms 23 and 25 are attached, also includes a pair of downwardly extending lugs 26 one of which is shown in Figure II. The downwardly depending lugs 26 ride on a tie rod 27 (see also Figure IV) mounted in end frames 28 of the tiltable housing 6. The front portion, the larger end, of the pyramidal lens cell 15 is equipped with a roller 29 (Figure IV) running on a track 30 attached to a tie bar 31 also extending between and attached to the end frames 28.

The end frames 28 are pivotally mounted on forwardly extending arms 32 and 33 slidably mounted on the upwardly extending frame arms 11 and branch arms 34 of the end pedestal of the scale. A counterbalancing spring 35 connected between the rear end of the arm 32 and a link 36 attached to the upper front corner of the left end frame 28 counterbalances the weight of the tiltable housing 6 and viewing device 4. To prevent twisting strain a second counterbalancing mechanism is included at the other end of the assembly and attached to the other of the end plates 28.

Referring now to Figure III it is noted that a price chart 37 is located along the path of travel of the viewing device 4 and has indicia arranged to cooperate with an index 38 fixed on the lower front edge of the lens cell 15. This position of the price index and price chart such that they are directly visible as the viewing device is being moved along its path is preferable to placing a price chart immediately adjacent the rotatable chart 10 and viewing it through the magnifying lens 16. While the chart is visible in either case, if viewed through the lens 16, it has a rapid apparent movement during movement of the viewing device 4. By having the price chart 37 and its index 38 outside the field of view and completely visible at all times this apparent movement is eliminated and the operator may quickly and easily identify the position of the lens assembly while he is moving it just as well as when it is at rest.

To avoid confusion a pair of curtains 39 and 40 are attached to and extend in opposite directions from the front sides of the pyramidal lens cell 15 to conceal all portions of the chart 10 except that small section in the field of view of the viewing device. The curtains 39 and 40 are wound on spools 41 and 42 one of which is sleeved over the vertical shaft 20 and the other of which is sleeved over a second vertical shaft 43 the lower end of which carries the second sprocket 24. A pair of helical springs 44 and 45 sleeved over the upper ends of the vertical shafts 20 and 43 are connected between the shaft and the slots and fixed to maintain tension on the curtains as they are wound or unwound from the spools as the viewing device 4 moves along its path of travel.

Since the viewing device 4 can display but one band or row of money value indicia at one time and since it is also necessary to display an indication in units of weight, a separate row of indicia 46 is provided adjacent one end of the chart 10 and optical means are provided so that these weight graduations may be seen through the window 8.

Referring to Figure V the optical means included behind the window 8 for displaying the weight indications comprise a lens 47 and an internal reflecting prism 48 arranged within the cupola-like housing 9 over the end of the chart 10. A thin plate 49 mounted to an end frame of the scale is positioned laterally adjacent the end of and flush with the surface of the rotatable chart 10 in a position directly beneath the reflecting prism 48. An index 50 on the thin plate 49 cooperates with the row of weight indicia 46. Reflected and magnified images of the indicia 46 and the index 50 appear in the window 8 as shown in Figure III.

While optically it would be preferable to employ a right angle reflecting prism, the obtuse angle prism was selected so that the housing 9 could be located forward of the crack between the sections of the housing 3 and thus avoid the complications that would arise in assembly if the housing 9 were to extend across the crack between the housing portions.

A projected index line for the money value graduations displayed in magnified form through the lens 16 is provided by an optical system shown most clearly in Figure IV. As shown in Figure IV this optical system comprises a light source bulb 51 mounted with its filament located substantially on the axis of a tube 52 attached to the upper exterior surface of the lens cell 15. Light emitted from the filament and directed toward the chart 10 is received and reflected back to the filament by a spherical mirror 53 mounted in the tube 52. The reflected rays and those from the filament directed away from the chart 10 pass through a condenser lens 54 suitably mounted in the tube 52 and after reflection from a mirror 55 are focused on a slit 56 cut through a mask or light stop 57. The light passing through the slit 56 passes through a wide slot 58 in the upper wall of the lens cell 15 and falls upon a reflecting prism 59 mounted in the lower portion of the lens cell 15 in the space generally between the downwardly directed lugs 26. The light rays from the slit 56, after being internally reflected from the rear surface of the prism 59, emerge through a cylindrical convex surface 60 of the prism 59 and are focused to a fine bright line 61 on the surface of the chart 10. This bright line, being located on the surface of the chart 10, provides an index which is not subject to parallax and which, because of the compactness and efficiency of the optical system, is brilliant so as to be easily visible in spite of the relatively high illumination of the chart provided by light from the light bulb 51. In order that the light bulb may provide this high general illumination the rear portion of the upper wall or roof of the lens cell 15 has a notch 62 which registers with a corresponding notch 63 of the tube 52 so that light emerging downwardly and inclined toward the chart 10 may fall thereon. Likewise the lower portion of the spherical reflector 53 is cut away to increase the illumination of the upper part of the chart portion visible through the lens 16.

In this arrangement it is necessary that the tie rod 27 and the tie bar 31 be precisely parallel to each other and to the surface of the chart 10 so that the spacing between the chart 10 and the optical elements mounted on the lens cell 15 does not vary as the lens cell is moved along the track formed by the tie rods. Any substantial deviations of the lens cell 15 from the correct path spoils the sharpness of focus of the line on the chart 10 and also produces a vertical movement of the position of the bright line relative to the lens cell. Such relative movement, of course, introduces errors.

This particular arrangement of an optical system carried on the lens cell provides a high level of illumination on the chart surface as well as an extremely brilliant reading line that shows up nicely on the chart. Furthermore, the compact arrangement allows this level of illumination to be maintained with a small light bulb rather than a large projection bulb thereby eliminating the introduction of excess heat into the housing and adjacent the fragile chart. Mounting the optical system on the lens cell also makes it possible and practical to confine all of the available light to a relatively short reading line and thus further enhance the brilliantness of the indications without the heat of a higher intensity light source.

Various modifications of the optical system and the manner of mounting on the movable lens cell may be made without departing from the spirit and scope of the invention.

Having described the invention, I claim:

1. In an apparatus for projecting an index line onto the surface of a rotatable indicia bearing chart within the field of view of a movable viewing device, in combination a cylindrical chart bearing rows of indicia, a magnifying lens for displaying magnified images of indicia within the field of view of the lens, a lens cell for housing the lens, a track extending along the chart and parallel to the axis of the chart for supporting the lens cell, means for moving the lens cell along the track, a light source mounted on the cell in direct illuminating relation to the portion of the chart in the field of view of the lens, and optical elements mounted on the lens cell for directing light from the light source into a sharp line on the chart within the field of view of the lens, said elements including a member having a slit, a condensing lens for focusing light from the source onto the slit, and a cylindrical lens for focusing light passing through the slit onto the chart.

2. In an apparatus for projecting an index line onto the surface of a rotatable indicia bearing chart within the field of view of a movable viewing device, in combination, a cylindrical chart bearing rows of indicia, a magnifying lens for displaying magnified images of indicia within the field of view of the lens, a lens cell for housing the lens, a track extending along the chart and parallel to the axis of the chart for supporting the lens cell, means for moving the lens cell along the track, a light source mounted on the lens cell, and an optical projection system mounted on the lens cell, said system comprising a mask having a slit, means for focusing light from the light source onto the slit, and a cylindrical lens for focusing an image of the slit onto the chart.

References Cited in the file of this patent

UNITED STATES PATENTS

| Number | Name | Date |
|---|---|---|
| 1,295,842 | Berger | Mar. 4, 1919 |
| 1,487,514 | Goss | Mar. 18, 1924 |
| 1,671,272 | Buckingham | May 29, 1928 |
| 1,684,212 | Berger | Sept. 11, 1928 |
| 1,685,790 | Thomas | Oct. 2, 1928 |
| 1,701,028 | Buckingham | Feb. 5, 1929 |
| 1,715,074 | Platten | May 28, 1929 |
| 2,025,590 | Jaenichen et al. | Dec. 24, 1935 |